US012698030B2

(12) United States Patent
Brocke et al.

(10) Patent No.: US 12,698,030 B2
(45) Date of Patent: Aug. 4, 2026

(54) METHOD FOR OPERATING A HYDROSTATIC VEHICLE STEERING SYSTEM

(71) Applicant: DEERE & COMPANY, Moline, IL (US)

(72) Inventors: Stefan Brocke, Mannheim (DE); Fabian Hartmann, Nehren (DE); Abhijit Hingne, Khamgaon (IN)

(73) Assignee: DEERE & COMPANY, Moline, IL (US)

( * ) Notice: Subject to any disclaimer, the term of this patent is extended or adjusted under 35 U.S.C. 154(b) by 304 days.

(21) Appl. No.: 18/586,845

(22) Filed: Feb. 26, 2024

(65) Prior Publication Data

US 2024/0317303 A1     Sep. 26, 2024

(30) Foreign Application Priority Data

Mar. 20, 2023     (DE) ......................... 102023106914.4

(51) Int. Cl.
*B62D 5/093*     (2006.01)

(52) U.S. Cl.
CPC .................................... *B62D 5/093* (2013.01)

(58) Field of Classification Search
CPC ...... B62D 5/0433; B62D 5/091; B62D 5/092; B62D 5/093
See application file for complete search history.

(56) References Cited

U.S. PATENT DOCUMENTS

| 5,503,240 | A | * | 4/1996 | Hong | ................... B62D 5/0433 |
| | | | | | 180/446 |
| 9,643,642 | B2 | * | 5/2017 | Kuramochi | ............ B62D 6/008 |
| 10,668,947 | B2 | * | 6/2020 | Eagles | ................... B62D 5/093 |
| 11,974,520 | B2 | * | 5/2024 | Gunda | ................... A01D 57/22 |
| 2025/0136171 | A1 | * | 5/2025 | Brocke | ................. B62D 5/003 |

FOREIGN PATENT DOCUMENTS

| DE | 102014201092 A1 | 7/2015 | |
| DE | 102022103106 A1 | 8/2023 | |
| KR | 20220060025 A | * 5/2022 | ......... B62D 15/0215 |

OTHER PUBLICATIONS

Extended European Search Report and Written Opinion issued in European Patent Application No. 24158996.9 dated Sep. 4, 2024, in 19 pages.

* cited by examiner

*Primary Examiner* — Minnah L Seoh
*Assistant Examiner* — Hosam Shabara

(57) ABSTRACT

A method for operating a hydrostatic vehicle steering system includes rotationally operating an input shaft via a steering handle, rotary operating a steering dosing valve via an output shaft, the steering dosing valve used for hydraulic actuation of a steering cylinder interacting with steerable vehicle wheels, establishing a releasable rotary connection between the input shaft and the output shaft via a clutch, applying a predefinable steering torque to the output shaft via an actuating drive, automatically assuming a closed clutch position of the clutch under the effect of a restoring spring force in a first operating mode intended for manual steering operation, and bringing the clutch into an open clutch position counter to the effect of the restoring spring force via a controller in a second operating mode intended for autonomous steering operation.

20 Claims, 6 Drawing Sheets

METHOD FOR OPERATING A HYDROSTATIC VEHICLE STEERING SYSTEM

CROSS-REFERENCE TO RELATED APPLICATIONS

This application claims priority to German Patent Application No. 102023106914.4, filed Mar. 20, 2023, which is hereby incorporated by reference.

FIELD OF THE DISCLOSURE

The disclosure relates to a method for operating a hydrostatic vehicle steering system.

BACKGROUND

The use of hydrostatic vehicle steering systems allows comfortable steering even of heavy utility vehicles, such as agricultural tractors, but also other vehicles from the agricultural, forestry or construction machinery sectors.

SUMMARY

Corresponding to its basic construction, a hydrostatic vehicle steering system comprises a steering handle in the form of a steering wheel, by means of which a steering dosing valve in the form of an orbitrol, which is fed with pressurized hydraulic fluid from a high-pressure hydraulic pump, can be set in rotation in order to actuate a steering cylinder connected thereto to move steerable wheels of the vehicle. The function of the orbitrol is limited to setting the hydraulic flow in the direction of the steering cylinder, whereas the hydraulic pressure, and hence the hydraulic energy, is provided by the high-pressure hydraulic pump. In this way, actuating forces that take account even of the conditions of heavy vehicles can be generated without difficulties.

Also becoming increasingly important are steering assistance systems as are known primarily from the car sector, inter alia for helping the operator to keep to a predefined lane. In the latter case, haptically perceivable operating or manual torques are generally applied to a steering column connected to a steering wheel, in such a manner that the operator receives an unambiguous indication of the direction of a driving direction correction that may need to be carried out.

In contrast to steering systems used in the car sector, in hydrostatic vehicle steering systems there is no mechanical reach-through between the steering wheel and the steerable vehicle wheels. This in turn leads to particularities when such a hydrostatic vehicle steering system is to be operated in conjunction with different steering assistance systems.

The object of the present disclosure is therefore to specify a method for operating a hydrostatic vehicle steering system that is optimized in terms of use with different steering assistance systems.

This object is achieved by a method for operating a hydrostatic vehicle steering system having the features of one or more of the following embodiments.

Advantageous developments of the method according to the disclosure can be found in the in one or more of the following embodiments.

In the method for operating a hydrostatic vehicle steering system, the vehicle steering system comprises an input shaft, which can be rotationally operated by means of a steering handle; an output shaft for rotary operation of a steering dosing valve, which is used for hydraulic actuation of a steering cylinder interacting with steerable vehicle wheels; a clutch device for establishing a releasable rotary connection between the input shaft and the output shaft; and an actuating drive for applying a predefinable steering torque to the output shaft. The clutch device automatically assumes a closed clutch position under the effect of a restoring spring force in a first operating mode intended for manual steering operation and is brought into an open clutch position counter to the effect of the restoring spring force at the prompting of a control unit (e.g., a controller including a processor and memory) in a second operating mode intended for autonomous steering operation.

In the first operating mode intended for manual steering operation, the steering interventions are carried out by an operator via the steering handle, which is usually in the form of a steering wheel. In this case, a haptically perceivable operating or manual torque can be caused on the steering handle by means of the actuating drive by targeted application of a corresponding steering torque to the output shaft and thus to the input shaft connected rotationally to the output shaft via the clutch device, in a "feedback assistance mode" carried out by the control unit, in order, for example, (i) to indicate a driving direction correction to be carried out via the steering handle, (ii) to feed back actuating torques acting on the steerable vehicle wheels as a result of driving, and/or (iii) to generate a steering resistance dependent on the steering angle and possibly further parameters. On the other hand, active steering force assistance can also be realized if the hydraulic supply of the hydrostatic vehicle steering system fails, in an "emergency assistance mode" carried out by the control unit. The steering torque generated by means of the actuating drive can be sensed by means of a torque sensor assigned to the output shaft and fed back to the control unit to form a control loop.

In other words, in the first operating mode, the actuating drive is, for example, actuated by the control unit in the sense of haptically perceivable steering feedback and/or a reduction in steering operation forces to be applied by the operator.

The second operating mode, however, is reserved for carrying out autonomous steering operation. In this case, in the second operating mode, the actuating drive can be actuated by the control unit according to steering commands predefined by an autonomous vehicle controller, for example according to a trajectory to be driven by the vehicle. In such a "driving assistance mode", the release of the rotary connection between the input shaft and the output shaft carried out by opening the clutch device ensures that the steering handle does not also move in a manner that annoys the operator. During this, the steering handle can be fixed in that a free rotation of the input shaft is inhibited in the second operating mode by means of a brake element that is passive or can be operated by the control unit.

The aforementioned driving assistance mode can be implemented in agricultural tractors manufactured by John Deere, for example, in the context of the use of a so-called AutoTrac steering system.

It should be noted in addition that the operation of the vehicle steering system is fail-safe because in the event of a fault the clutch device returns automatically into the first operating mode intended for manual steering operation under the effect of the restoring spring force. The steerability of the vehicle by the operator is thus guaranteed even in such circumstances.

As a result, the method according to the disclosure for operating a hydrostatic vehicle steering system makes it possible to meet the requirements of different steering assistance systems that use the actuating drive.

The actuating drive is for example an electric gear motor that can be actuated by the control unit. It is conceivable for a slip clutch or the like to be integrated in the gear motor, which slip clutch makes it possible for the operator to influence the vehicle steering system by rotation of the steering handle and thus of the steering dosing valve at any time in the first operating mode irrespective of the operating state of the actuating drive. Alternatively, a limitation of the motor torque of the gear motor to a value that can be overcome by the operator via the steering handle or else a device for switching off the gear motor can also be provided for this purpose.

To ensure that the operator always retains control of the vehicle steering system, there is also the possibility of the clutch device switching over into the first operating mode from the second operating mode in the event of a manual steering operation exerted via the steering handle and/or a pressure drop of a hydraulic source provided for feeding the steering dosing valve with pressurized hydraulic fluid. The latter case corresponds to the emergency assistance mode intended for a failure of the hydraulic supply of the hydrostatic vehicle steering system. The switchover into the first operating mode can in this case be carried out automatically by the control unit, to which end the latter evaluates the signals from an angle sensor for sensing a rotation occurring at the steering handle or the input shaft of the vehicle steering system or from a pressure sensor for monitoring a delivery pressure of a high-pressure hydraulic pump included in the hydraulic source.

In some embodiments, the clutch device is brought into the open clutch position, at the prompting of a switchover signal that can be generated by means of an operating arrangement, only when first and second trigger signals transmitted by the control unit are present at the operating arrangement at the same time. The AND operation formed in this way largely excludes a situation in which the rotary connection established between the input shaft and the output shaft by means of the clutch device is unintentionally released.

First, it is conceivable for the clutch device to be electrically operated, wherein it automatically assumes the closed clutch position under the effect of a restoring spring force of an electrically controllable switchover mechanism when in the non-energized state. In this case there is the possibility that the operating arrangement comprises a series circuit of first and second electrical normally open contacts, which are brought into a closed position at the prompting of the first and second trigger signals to generate an electrical switchover signal actuating the switchover mechanism. The electrical normally open contacts, which are in particular designed as parts of associated relays, automatically assume an open position under the effect of a restoring spring force when in the non-operated state. A fail-safe function can be implemented thereby, which ensures that the clutch device remains in its closed clutch position if one of the two relays fails or if trigger signals are erroneous. In some embodiments, the clutch device is brought into its open clutch position only when both normally open contacts assume their closed position at the same time and the electrical switchover signal present on the output side assumes a voltage value suitable for operating the clutch device or the switchover mechanism. The relays can be electromechanical or else designed as semiconductors.

Alternatively, the above-described function can also be implemented for the case in which the clutch device is designed to be operated by hydraulic pressure, wherein it automatically assumes the closed clutch position under the effect of a restoring spring force of a hydraulically controllable switchover mechanism when in the depressurized state. To this end, the operating arrangement can comprise a parallel circuit of first and second hydraulic 3/2-way valves, the valve outlets of which are connected to one another, wherein these are transferred from a rest position connecting the valve outlets to a hydraulic reservoir into an operating position connecting the valve outlets to the hydraulic source at the prompting of the first and second trigger signals in order to generate a hydraulic switchover signal actuating the switchover mechanism. If one of the two 3/2-way valves is in its rest position, a pressure buildup at the valve outlets is prevented owing to the pressure relief connection to the hydraulic reservoir. In this way, a fail-safe function is implemented here too, which ensures that the clutch device remains in its closed clutch position if one of the two 3/2-way valves fails or if trigger signals are erroneous.

As a result, the clutch device is brought into its open clutch position only if both 3/2-way valves are in their operating position at the same time and the hydraulic switchover signal present at the valve outlets assumes a pressure value suitable for operating the clutch device or the switchover mechanism, according to some embodiments.

The actual operation of the relays or of the 3/2-way valves by the control unit takes place electrically, for example, in the latter case by the use of an associated solenoid in each case.

The above and other features will become apparent from the following detailed description and accompanying drawings.

BRIEF DESCRIPTION OF THE DRAWINGS

The method according to the disclosure for operating a hydrostatic vehicle steering system is explained in more detail below with reference to the appended drawings. Here, identical reference signs relate to corresponding components or components which are comparable with respect to their function. In the drawings.

DETAILED DESCRIPTION

The embodiments or implementations disclosed in the above drawings and the following detailed description are not intended to be exhaustive or to limit the present disclosure to these embodiments or implementations.

Figure 1:
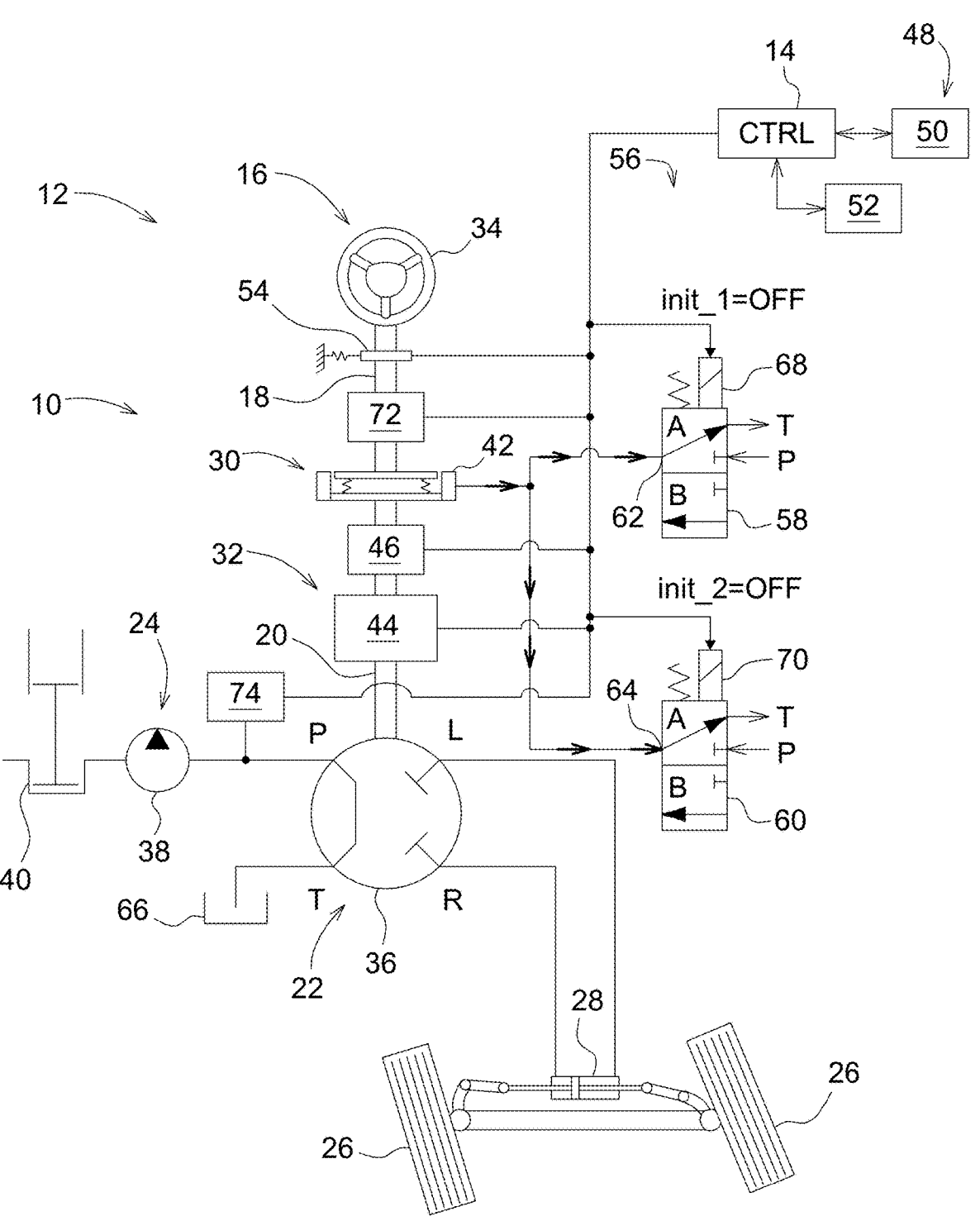
FIG. 1 shows a first embodiment of a hydrostatic vehicle steering system operated by means of the method according to the disclosure, in a first operating mode.
Figure 2:
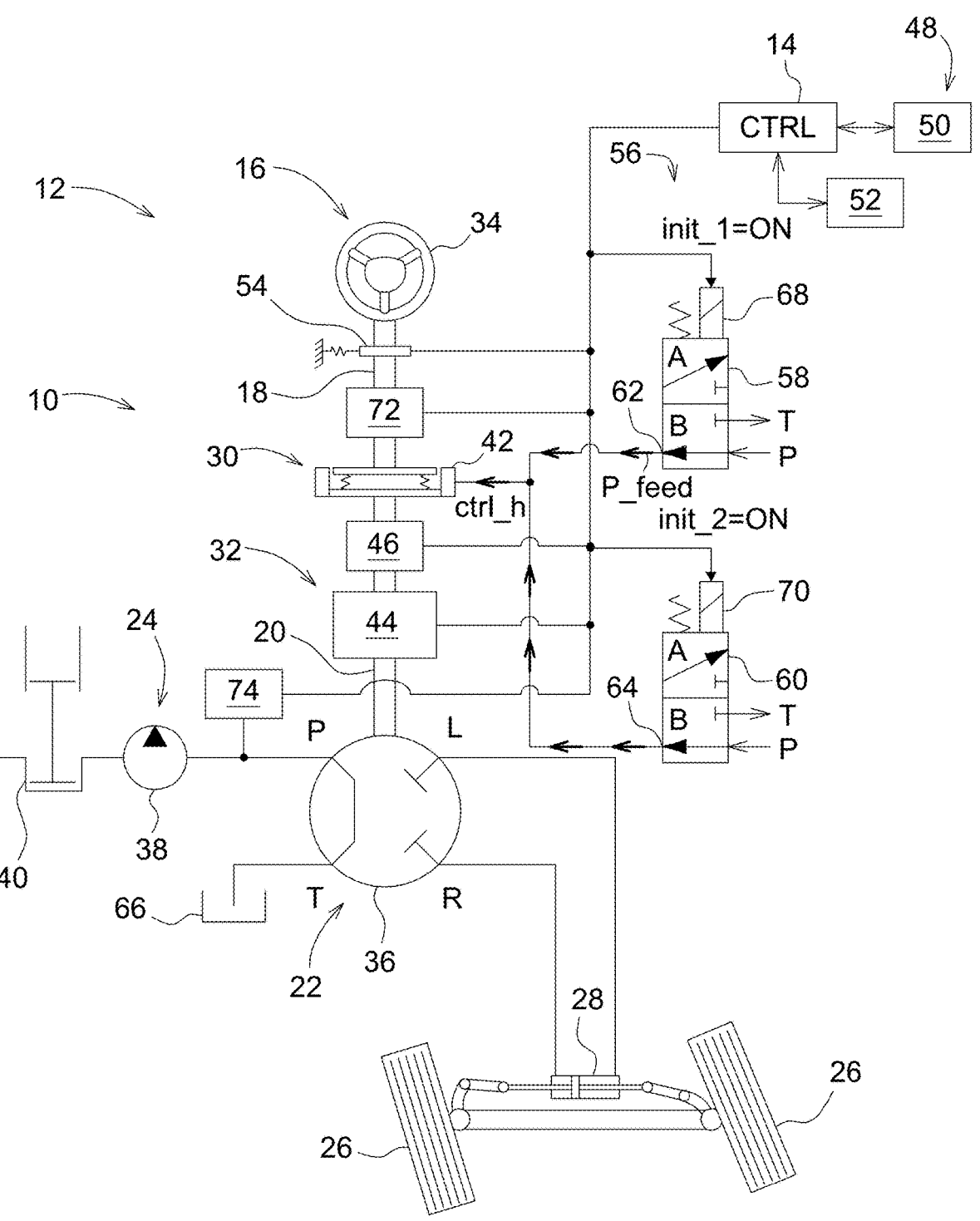
FIG. 2 shows the hydrostatic vehicle steering system shown in FIG. 1 in a second operating mode.
Figure 3:
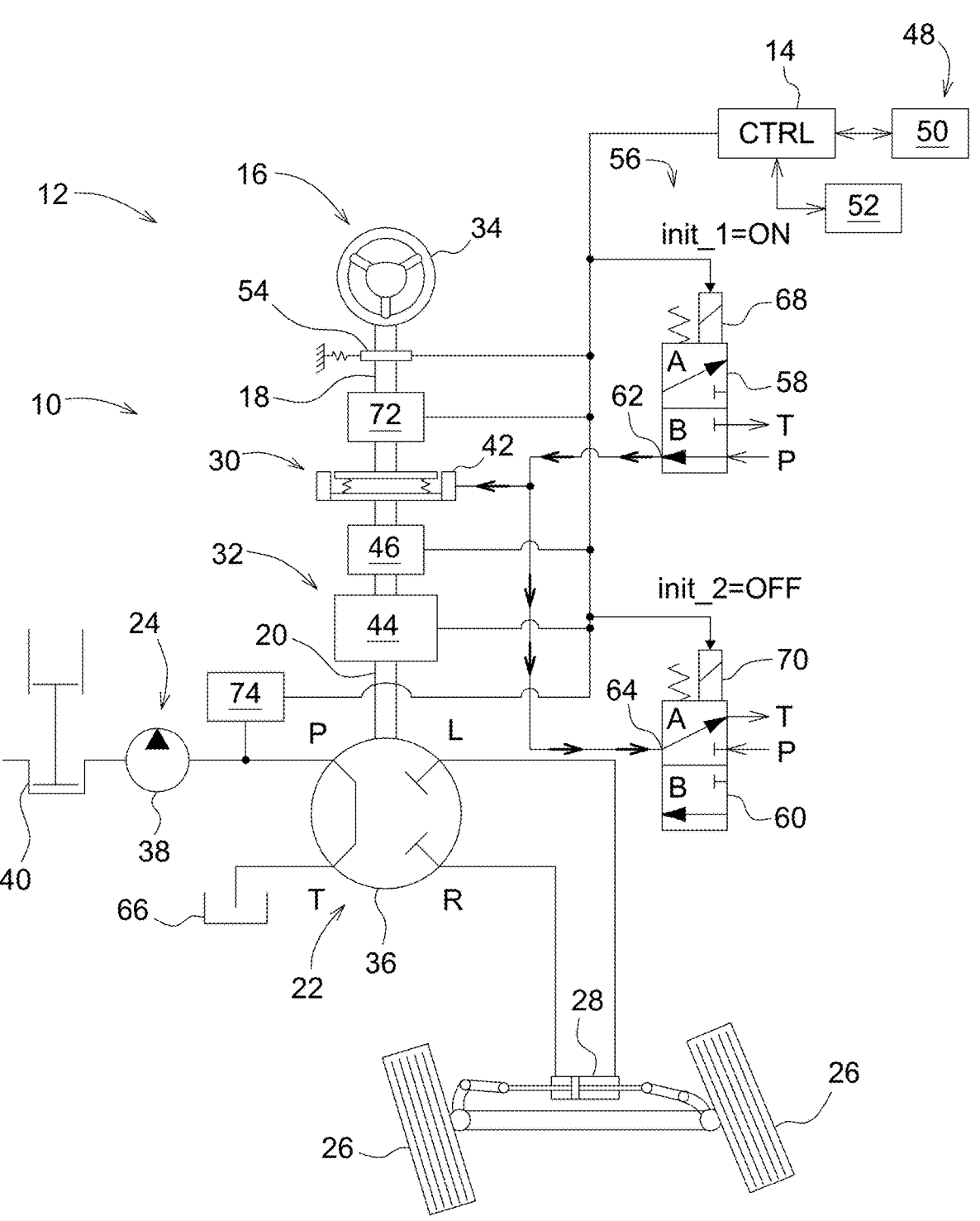
FIG. 3 shows a fail-safe function carried out by the hydrostatic vehicle steering system shown in FIG. 1.

FIGS. 1 to 3 show a first embodiment of a hydrostatic vehicle steering system 10 operated by means of the method according to the disclosure, in a vehicle in the form of an agricultural tractor 12. Different operating states are shown, wherein the method according to the disclosure is carried out by a microprocessor-controlled control unit 14 (e.g., a controller including a processor and memory), which is likewise part of the vehicle steering system 10.

The use in an agricultural tractor 12 is merely an example; the vehicle can just as well be a different vehicle from the agricultural, forestry or construction machinery sectors.

As can be seen in FIG. 1, the hydrostatic vehicle steering system 10 accommodated in the agricultural tractor 12 (not shown in detail) comprises an input shaft 18, which can be rotationally operated by means of a steering handle 16; an output shaft 20 for rotary operation of a steering dosing valve 22, which is fed with pressurized hydraulic fluid from a hydraulic source 24 and is used for hydraulic actuation of a steering cylinder 28 interacting with steerable vehicle wheels 26; a clutch device 30 for establishing a releasable rotary connection between the input shaft 18 and the output shaft 20; and an actuating drive 32 for applying a predefinable steering torque to the output shaft 20. The steering handle 16 is for example a conventional steering wheel 34.

The function of the steering dosing valve 22 in the form of an orbitrol 36 is limited to setting the hydraulic flow in the direction of the steering cylinder 28, whereas the hydraulic pressure, and hence the hydraulic energy, is provided by the hydraulic source 24 in the form of a high-pressure hydraulic pump 38. The high-pressure hydraulic pump 38 is driven by a drive motor 40, in the present case a diesel engine of the agricultural tractor 12.

According to the first embodiment of the vehicle steering system 10 shown in FIGS. 1 to 3, the clutch device 30 is designed to be operated by hydraulic pressure, wherein it automatically assumes a closed clutch position under the effect of a restoring spring force of a hydraulically controllable switchover mechanism 42 when in the depressurized state. This state corresponds to a first operating mode of the clutch device 30, which is shown in FIG. 1 and is intended for the case of manual steering operation and in which the input shaft 18 and the output shaft 20 are coupled to one another for conjoint rotation so that a rotation of the steering handle 16 and thus of the steering dosing valve 22 is converted directly into a deflection of the steering cylinder 28 corresponding thereto. In addition, FIG. 2 shows a second operating mode intended for autonomous steering operation, in which the clutch device 30 is brought into an open clutch position counter to the effect of the restoring spring force of the switchover mechanism 42 at the prompting of the control unit 14.

The actuating drive 32 is an electric gear motor 44 that can be actuated by the control unit 14. A slip clutch (not shown) is integrated in the gear motor 44, which slip clutch makes it possible for the operator to influence the vehicle steering system 10 by rotation of the steering handle 16 and thus of the steering dosing valve 22 at any time in the first operating mode irrespective of the operating state of the actuating drive 32.

In the case of the first operating mode intended for manual steering operation according to FIG. 1, the steering interventions are made by the operator via the steering handle 16. In this case, a haptically perceivable operating or manual torque can be caused on the steering handle 16 by means of the actuating drive 32 by targeted application of a corresponding steering torque to the output shaft 20 and thus to the input shaft 18 connected rotationally to the output shaft via the clutch device 30, in a "feedback assistance mode" carried out by the control unit 14, in order (i) to indicate a driving direction correction to be carried out via the steering handle 16, (ii) to feed back actuating torques acting on the steerable vehicle wheels 26 as a result of driving, and/or (iii) to generate a steering resistance dependent on the steering angle and possibly further parameters. On the other hand, active steering force assistance can also be realized if the hydraulic supply of the hydrostatic vehicle steering system 10, in particular the high-pressure hydraulic pump 38, fails, in an "emergency assistance mode" carried out by the control unit 14. The steering torque generated by the actuating drive 32 is sensed by means of a torque sensor 46 assigned to the output shaft 20 and fed back to the control unit 14 to form a control loop.

The feedback assistance modes (i), (ii) or (iii) are assigned to respective steering assistance systems, which are selected by the operator via a user interface 48, in the present case a touch-sensitive display 50, connected to the control unit 14. The feedback assistance mode (iii) corresponds to so-called parameter steering, in which an operating resistance that increases with the steering angle can be implemented, as can the modification thereof depending on driving speed.

If, however, the clutch device 30 is in the second operating mode reserved for carrying out autonomous steering operation according to FIG. 2, the actuating drive 32 is actuated by the control unit 14 according to steering commands predefined by an autonomous vehicle controller 52, for example according to a trajectory to be driven by the agricultural tractor 12. In such a "driving assistance mode", the release of the rotary connection between the input shaft 18 and the output shaft 20 carried out by opening the clutch device 30 ensures that the steering handle 16 does not also move in a manner that annoys the operator. During this, the steering handle 16 is fixed in that a free rotation of the input shaft 18 is inhibited in the second operating mode by means of a brake element 54 that can be operated by the control unit 14. The driving assistance mode is selected by the operator via the user interface 48 communicating with the control unit 14.

For pressure operation of the clutch device 30 or of the switchover mechanism 42 and thus for switchover from the first to the second operating mode, an operating arrangement 56 is used, which comprises a parallel circuit of first and second hydraulic 3/2-way valves 58, 60, the valve outlets 62, 64 of which are connected to one another. In this case, the two 3/2-way valves 58, 60 can be transferred from a rest position A (see FIG. 1) connecting the valve outlets 62, 64 to a hydraulic reservoir 66 into an operating position B (see FIG. 2) connecting the valve outlets 62, 64 to the hydraulic source 24 or the high-pressure hydraulic pump 38 at the prompting of a first and a second trigger signal init_1, init_2 transmitted by the control unit 14, in order to generate a hydraulic switchover signal ctrl_h that actuates the switchover mechanism 42. If both 3/2-way valves 58, 60 are in their operating position B, the delivery pressure p_feed generated by the high-pressure hydraulic pump 38 is present at the valve outlets 62, 64. This delivery pressure is used to load the switchover mechanism 42 so that the clutch mechanism 30 is displaced into its open clutch position.

If one of the two 3/2-way valves 58, 60 is in its rest position A, a pressure buildup at the valve outlets 62, 64 is prevented owing to the pressure relief connection to the hydraulic reservoir 66. This situation is shown in FIG. 3, in which a fail-safe function is implemented, which ensures that the clutch device 30 remains in its closed clutch position if one of the two 3/2-way valves 58, 60 fails or if trigger signals init_1, init_2 are erroneous.

As a result, the clutch device 30 is brought into its open clutch position only if both 3/2-way valves 58, 60 are in their operating position B at the same time and the hydraulic switchover signal ctrl_h present at the valve outlets 62, 64 assumes a pressure value, in this case that of the delivery pressure p_feed, suitable for operating the clutch device 30 or the switchover mechanism 42.

An AND operation of the two trigger signals init_1, init_2 is formed thereby, which largely excludes a situation in which the rotary connection established between the input shaft 18 and the output shaft 20 by means of the clutch device 30 is unintentionally released.

The actual operation of the 3/2-way valves 58, 60 by the trigger signals init_1, init_2 transmitted by the control unit 14 takes place electrically, in the present case by the use of an associated solenoid 68, 70 in each case.

To ensure that the operator always retains control of the vehicle steering system 10, the clutch device 30 is switched over into the first operating mode from the second operating mode in the event of a manual steering operation exerted via the steering handle 16 and/or a pressure drop of the hydraulic source 24 or high-pressure hydraulic pump 38 provided for feeding the steering dosing valve 22. The latter case corresponds to the emergency assistance mode intended for a failure of the hydraulic supply of the vehicle steering system 10. The switchover into the first operating mode in this case is carried out automatically by the control unit 14, to which end the latter evaluates the signals from an angle sensor 72 for sensing a rotation occurring at the steering handle 16 or the input shaft 18 of the vehicle steering system 10 or from a pressure sensor 74 for monitoring the delivery pressure p_feed of the high-pressure hydraulic pump 38.

Figure 4:
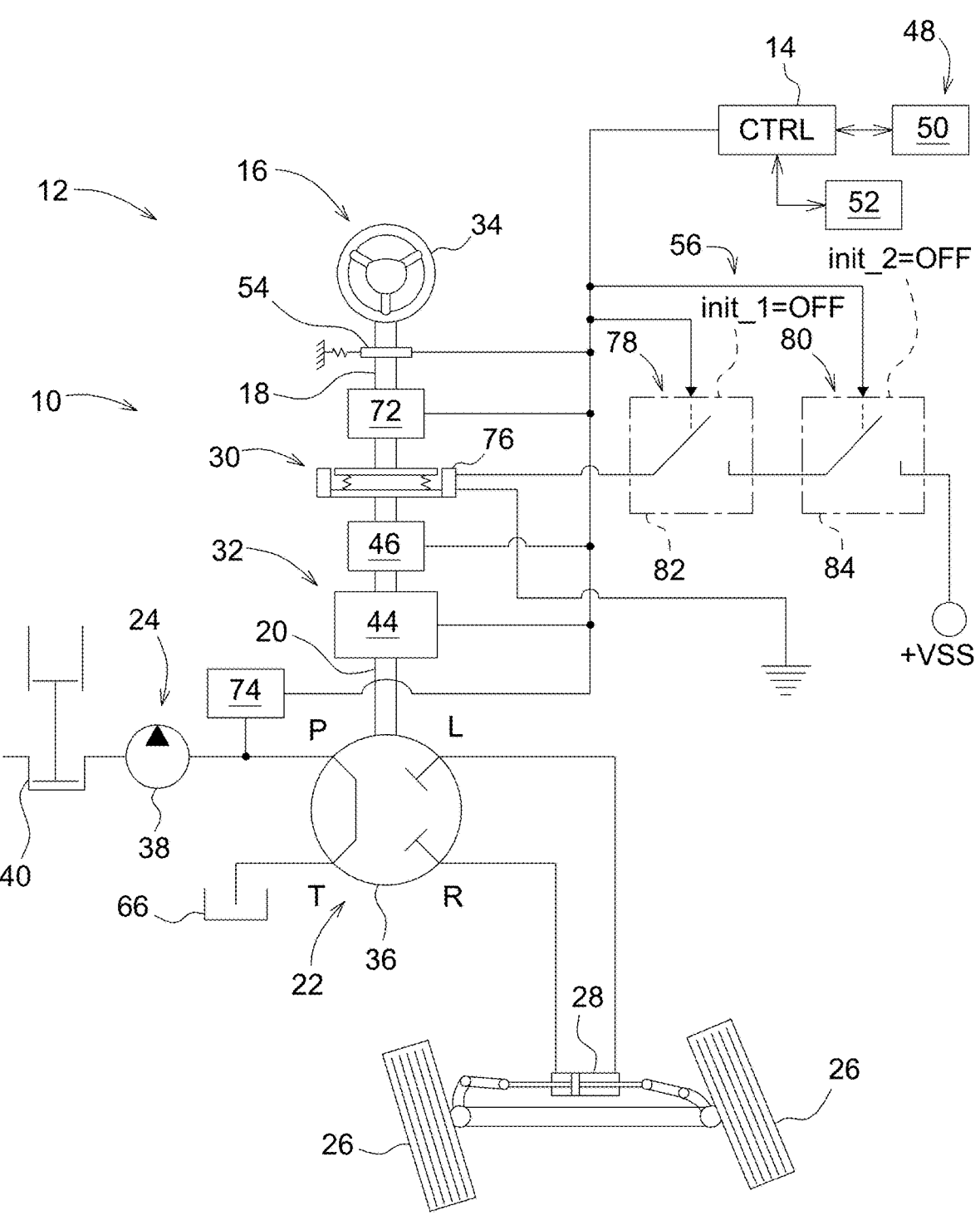
FIG. 4 shows a second embodiment of a hydrostatic vehicle steering system operated by means of the method according to the disclosure, in a first operating mode.
Figure 5:
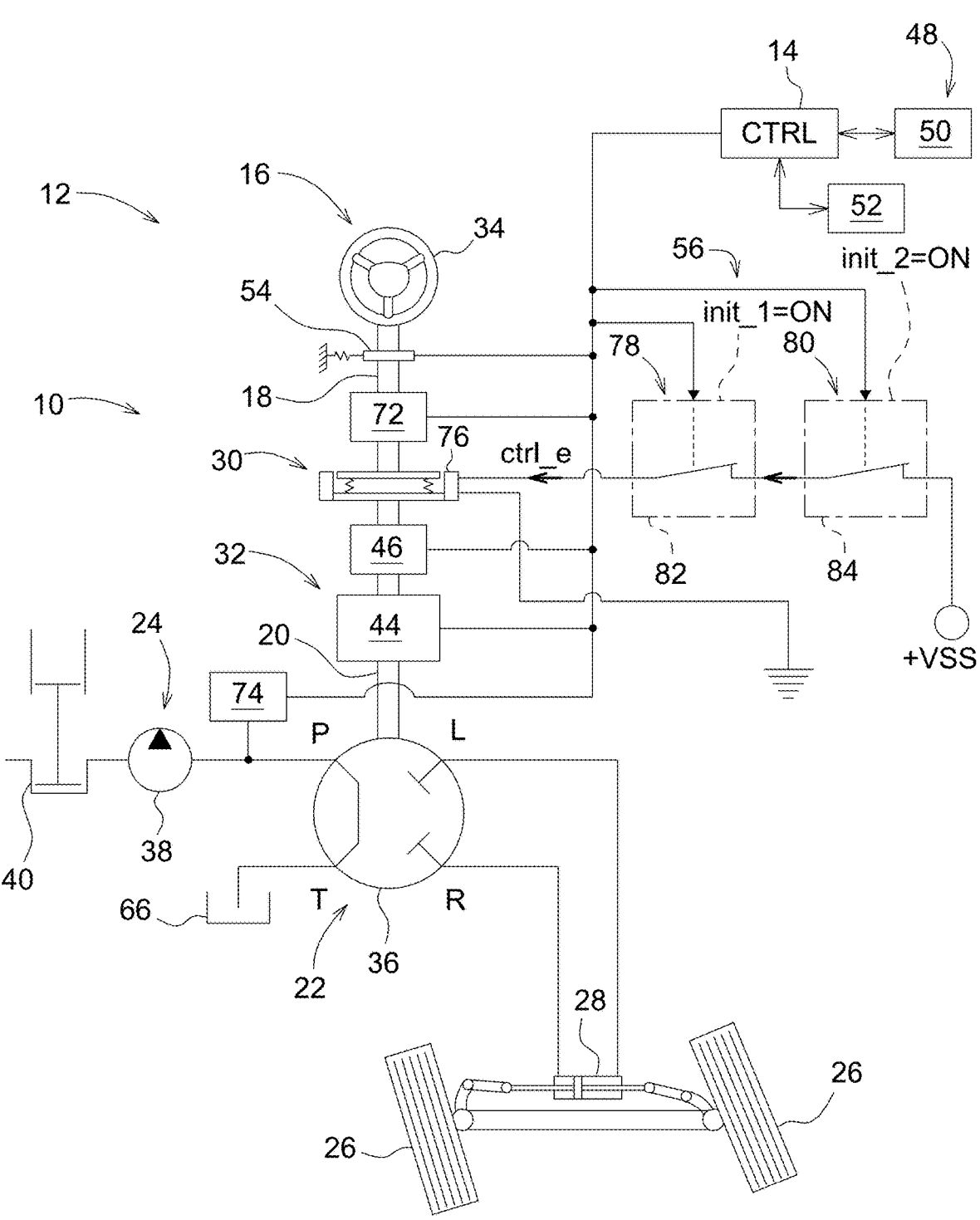
FIG. 5 shows the hydrostatic vehicle steering system shown in FIG. 4 in a second operating mode.
Figure 6:
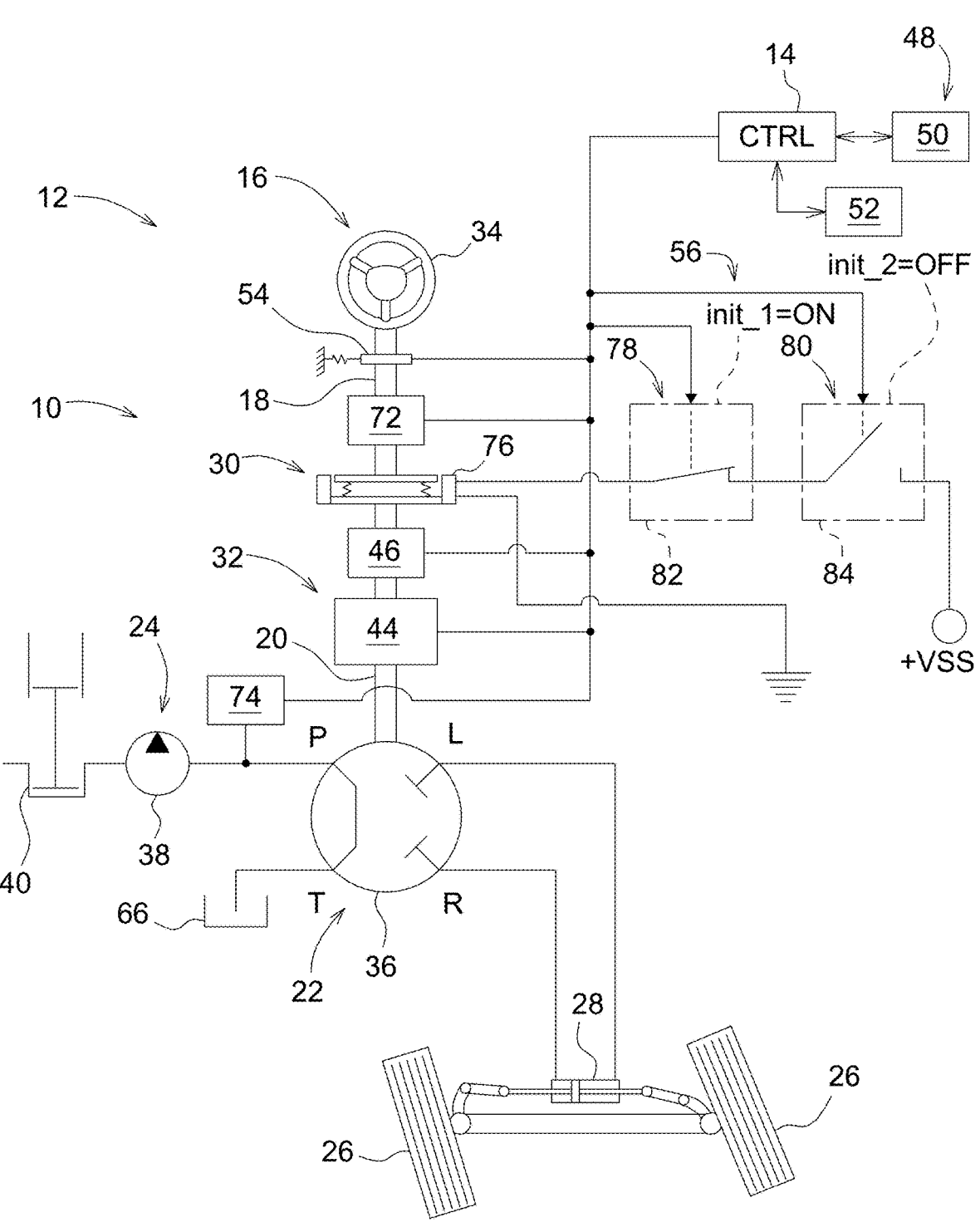
FIG. 6 shows a fail-safe function carried out by the hydrostatic vehicle steering system shown in FIG. 4.

FIGS. 4 to 6 show a second embodiment of a hydrostatic vehicle steering system 10 operated by means of the method according to the disclosure. This embodiment differs from the first embodiment only by the design of the operating arrangement 56. The clutch device 30 in the present case is thus electrically operated, wherein it automatically assumes the closed clutch position under the effect of a restoring spring force of an electrically controllable switchover mechanism 76 when in the non-energized state according to FIG. 4. With regard to the implementation of the different (assistance) modes, reference is therefore made to the description of the first embodiment.

For example, the operating arrangement 56 comprises a series circuit of first and second electrical normally open contacts 78, 80. These can be brought into a closed position at the prompting of a first and a second trigger signal init_1, init_2 transmitted by the control unit 14 to generate an electrical switchover signal ctrl_e actuating the switchover mechanism 76. The electrical normally open contacts 78, 80, which in the present case are designed as parts of associated relays 82, 84, automatically assume an open position under the effect of a restoring spring force when in the non-operated state. A fail-safe function as shown in FIG. 6 can also be implemented thereby in the case of the second embodiment, which fail-safe function ensures that the clutch device 30 remains in its closed clutch position if one of the two relays 82, 84 fails or if trigger signals init_1, init_2 are erroneous.

According to FIG. 5, the clutch device 30 is brought into its open clutch position only when both normally open contacts 78, 80 assume their closed position at the same time and the electrical switchover signal ctrl_e present on the output side assumes a voltage value +Vss (corresponding to the vehicle electrical system voltage of the agricultural tractor 12) suitable for operating the clutch device 30 or the switchover mechanism 76.

In this case too, the AND operation of the two trigger signals init_1, init_2 formed in this way largely excludes a situation in which the rotary connection established between the input shaft 18 and the output shaft 20 by means of the clutch device 30 is unintentionally released.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for operating a hydrostatic vehicle steering system, comprising:

rotationally operating an input shaft via a steering handle;

rotary operating a steering dosing valve via an output shaft, the steering dosing valve used for hydraulic actuation of a steering cylinder interacting with steerable vehicle wheels;

establishing a releasable rotary connection between the input shaft and the output shaft via a clutch;

applying a predefinable steering torque to the output shaft via an actuating drive;

automatically assuming a closed clutch position of the clutch under the effect of a restoring spring force in a first operating mode intended for manual steering operation; and bringing the clutch into an open clutch position counter to the effect of the restoring spring force via a controller in a second operating mode intended for autonomous steering operation;

wherein the clutch is brought into the open clutch position, at the prompting of a switchover signal that can be generated via an operating arrangement, only when first and second trigger signals transmitted by the controller are present at the operating arrangement at the same time.

2. The method of claim 1, wherein, in the first operating mode, the actuating drive is actuated by the controller to provide one or more of a haptically perceivable steering feedback and a reduction in steering operation forces to be applied by the operator.

3. The method of claim 1, wherein, in the second operating mode, the actuating drive is actuated by the controller according to steering commands predefined by an autonomous vehicle controller.

4. The method of claim 1, wherein, in the second operating mode, a free rotation of the input shaft is inhibited via a brake element that is passive or can be operated by the controller.

5. The method of claim 1, wherein the actuating drive is an electric gear motor that can be actuated by the controller.

6. The method of claim 1, wherein the clutch is switched over into the first operating mode from the second operating mode in the event one or more a manual steering operation exerted via the steering handle and a pressure drop of a hydraulic source provided for feeding the steering dosing valve with pressurized hydraulic fluid.

7. The method of claim 1, wherein the clutch is electrically operated, wherein it automatically assumes the closed clutch position under the effect of a restoring spring force of an electrically controllable switch when in the non-energized state.

8. The method of claim 1, wherein the operating arrangement comprises a series circuit of first and second electrical normally open contacts, which are brought into a closed position at the prompting of the first and second trigger signals to generate an electrical switchover signal actuating the switch.

9. The method of claim 1, wherein the clutch is designed to be operated by hydraulic pressure, wherein it automatically assumes the closed clutch position under the effect of a restoring spring force of a hydraulically controllable switch when in the depressurized state.

10. The method of claim 1, wherein the operating arrangement comprises a parallel circuit of first and second hydraulic 3/2-way valves, the valve outlets of which are connected to one another, wherein these are transferred from a rest position connecting the valve outlets to a hydraulic reservoir into an operating position connecting the valve outlets to a hydraulic source at the prompting of the first and second trigger signals in order to generate a hydraulic switchover signal actuating the switch.

11. A hydrostatic vehicle steering system, comprising:

an input shaft, which can be rotationally operated via a steering handle;

an output shaft for rotary operation of a steering dosing valve, which is used for hydraulic actuation of a steering cylinder interacting with steerable vehicle wheels;

an actuating drive for applying a predefinable steering torque to the output shaft; and a clutch for establishing a releasable rotary connection between the input shaft and the output shaft, the clutch automatically assuming a closed clutch position under the effect of a restoring spring force in a first operating mode intended for manual steering operation, and the clutch being brought into an open clutch position counter to the effect of the restoring spring force via a controller in a second operating mode intended for autonomous steering operation;

wherein the clutch is brought into the open clutch position, at the prompting of a switchover signal that can be generated via an operating arrangement, only when first and second trigger signals transmitted by the controller are present at the operating arrangement at the same time.

12. The system of claim 11, wherein, in the first operating mode, the actuating drive is actuated by the controller to provide one or more of a haptically perceivable steering feedback and a reduction in steering operation forces to be applied by the operator.

13. The system of claim 11, wherein, in the second operating mode, the actuating drive is actuated by the controller according to steering commands predefined by an autonomous vehicle controller.

14. The system of claim 11, wherein, in the second operating mode, a free rotation of the input shaft is inhibited via a brake element that is passive or can be operated by the controller.

15. The system of claim 11, wherein the actuating drive is an electric gear motor that can be actuated by the controller.

16. The system of claim 11, wherein the clutch is switched over into the first operating mode from the second operating mode in the event one or more of a manual steering operation exerted via the steering handle and a pressure drop of a hydraulic source provided for feeding the steering dosing valve with pressurized hydraulic fluid.

17. The system of claim 11, wherein the clutch is electrically operated, wherein it automatically assumes the closed clutch position under the effect of a restoring spring force of an electrically controllable switch when in the non-energized state.

18. The system of claim 11, wherein the operating arrangement comprises a series circuit of first and second electrical normally open contacts, which are brought into a closed position at the prompting of the first and second trigger signals to generate an electrical switchover signal actuating the switch.

19. The system of claim 11, wherein the clutch is designed to be operated by hydraulic pressure, wherein it automatically assumes the closed clutch position under the effect of a restoring spring force of a hydraulically controllable switch when in the depressurized state.

20. The system of claim 11, wherein the operating arrangement comprises a parallel circuit of first and second hydraulic 3/2-way valves, the valve outlets of which are connected to one another, wherein these are transferred from a rest position connecting the valve outlets to a hydraulic reservoir into an operating position connecting the valve outlets to a hydraulic source at the prompting of the first and second trigger signals in order to generate a hydraulic switchover signal actuating the switch.

* * * * *